(12) United States Patent
Niewels (10) Patent No.: US 7,341,688 B2
(45) Date of Patent: Mar. 11, 2008

(54) VALVE GATE FOR A HOT RUNNER INJECTION MOLDING MACHINE

(75) Inventor: Joachim Johannes Niewels, Thornton (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 706 days.

(21) Appl. No.: 10/994,069

(22) Filed: Nov. 19, 2004

(65) Prior Publication Data

US 2006/0108713 A1    May 25, 2006

(51) Int. Cl.
*B29C 45/23*    (2006.01)
(52) U.S. Cl. .................................. 264/328.1; 425/548
(58) Field of Classification Search ............ 264/328.1; 425/564, 568
See application file for complete search history.

(56) References Cited

U.S. PATENT DOCUMENTS

| | | | |
|---|---|---|---|
| 4,213,751 A | 7/1980 | Fernandez | |
| 4,416,608 A * | 11/1983 | Deardurff | .................. 425/548 |
| 4,678,427 A | 7/1987 | Fritzsche | |
| 5,037,598 A | 8/1991 | Akselrud | |
| 5,071,340 A | 12/1991 | LaBianca | |
| 5,162,125 A | 11/1992 | Akselrud et al. | |
| 5,334,010 A | 8/1994 | Teng | |
| 5,423,672 A | 6/1995 | Gordon | |
| 5,840,231 A | 11/1998 | Teng | |
| 5,900,200 A | 5/1999 | Teng | |
| 6,135,757 A | 10/2000 | Jenko | |
| 6,214,275 B1 | 4/2001 | Catoen et al. | |
| 6,228,309 B1 | 5/2001 | Jones et al. | |
| 6,322,051 B1 | 11/2001 | Salmela | |
| 7,306,455 B2 * | 12/2007 | Dewar et al. | ................ 425/564 |
| 2004/0151799 A1 | 8/2004 | Gellert et al. | |

OTHER PUBLICATIONS

International Search Report for PCT/CA2005/001543, dated Jan. 26, 2006, three pages, related to the above-identified US patent application.

* cited by examiner

*Primary Examiner*—Jill L. Heitbrink (57) ABSTRACT

A method and apparatus for improving the quality of molded parts in a molding system having a valve stem and a valve gate. The valve stem is movable between a fully retracted position where the gate is fully open to a fully forward position where the gate is fully closed and into an intermediate position where the gate remains closed but the valve stem is displaced from the gate so heat transfer through the valve stem and into the gate region is minimized.

8 Claims, 7 Drawing Sheets

VALVE GATE FOR A HOT RUNNER INJECTION MOLDING MACHINE

BACKGROUND OF INVENTION

1. Field of the Invention

The present invention relates, generally, to an improved valve gate for an injection molding system, and more particularly, but not exclusively, the invention relates to means for controlling positioning of a valve stem in a valve gate to improve the efficiency of the molding operation.

2. Background Information

In an ideal situation, the valve stem of the valve gate is open during the fill and hold portion of the molding operation to allow proper filling of the mold and compensate for any shrinkage arising during hold. The stem would then be closed for cooling of the part in the mold, opening of the mold, removal of the part from the mold and the subsequent closure of the mold. The stem would only move to the open position just before the next fill cycle starts. However, this ideal operation can induce defects in the molded part due to heat transfer through contact of the heated valve stem with the cooled gate because of the steel-to-steel contact between the stem and the gate. To avoid these defects, it is common practice to maximize the time that the stem is held in the open position. This practice creates the risk that entrapped pressure in the hot runner channel may cause melt to be pushed in front of the open stem. This melt in front of the stem may become of different consistency, viscosity, and temperature compared to the melt upstream of the stem front face. If this inconsistent melt is then injected into the mold cavity, drool and other defects may occur.

Current injection molding systems have failed to satisfactorily resolve these conflicting requirements of long stem closure time to avoid drool and other related defects and a short stem closure time to avoid defects caused by undesirable heat transfer.

The present invention avoids this conflict by enabling the stem to be partially pulled back in such a way that it is not in contact with the cold gate when in the closed position. The front face of the valve stem is kept inside the nozzle tip land to avoid or at least reduce the likelihood of melt being pushed in front of the stem. Pulling back the stem slightly accomplishes the ideal function of minimizing heat leakage to the gate and encapsulating the melt in the hot runner.

U.S. Pat. No. 5,162,125 to Akselrud et al, patented Nov. 10, 1992, shows a molding device that uses a spring to close a mold gate.

U.S. Pat. No. 5,423,672 to Gordon, patented Jun. 13, 1995, shows a molding device for forming a disc with a hole therein. This patent shows a valve gated hot runner in which the valve stem is moved to an intermediate position by means of a dual piston combination. In the disc molding operation the valve stem is first moved forward to open the valve gate and allow resin to fill the mold cavity. Next the valve stem is partially retracted to block the melt flow and allow a lower part of the valve stem to form the hole in the disc. Finally, the valve stem is fully retracted to pull its hole forming section out of the molded part and to allow the molded part to be ejected conventionally from the core side of the mold.

U.S. Pat. No. 6,214,275 to Catoen et al, patented Apr. 10, 2001, shows a molding device that includes means to move a valve stem into an extended position to assist the ejection of molded parts and remove debris from the gate orifice and nub area of the melt channel.

U.S. Pat. No. 6,228,309 to Jones et al, patented May 8, 2001 shows a molding device that includes apparatus for moving a valve stem between a closed position, a partially open position and a fully open position. The partially open position enables restricted flow of melt to the mold cavity.

None of these references teach the concept of moving a valve stem into an intermediate position between an open and a closed position to minimize cooling of the end of the valve stem by the cooled gate insert.

SUMMARY OF INVENTION

The present invention provides an improved injection nozzle system and method for injection molding including a valve stem that is movable to an intermediate position to minimize cooling of the valve stem and prevent drooling of the melt into the gate insert and the egress of cooled melt back into the hot melt channel.

The present invention provides an injection nozzle for injection molding plastic resin from a source of molten resin to a mold cavity, which comprises: a mold cavity; an injection nozzle with a nozzle body and a nozzle tip and having an internal flow channel therein communicating with an injection orifice which in turn communicates with the mold cavity for transportation of molten resin to the mold cavity through an injection orifice. A valve stem is mounted in the injection nozzle and is movable between an open position retracted from the injection orifice permitting the flow of resin to the mold cavity, a closed position blocking the injection orifice and preventing flow of resin to the mold cavity, and an intermediate position between the open and closed position. Moving the stem to an intermediate position reduces the cooling effect of the mold cavity on the valve stem while the melt is solidifying in the mold cavity.

The present invention also provides a method for injection molding resin from a source of molten resin to a mold cavity which comprises: providing an injection nozzle with a nozzle body and a nozzle tip and having an internal flow channel therein communicating with an injection orifice which in turn communicates with a mold cavity; transporting molten resin from the internal flow channel to the mold cavity; mounting a valve stem in the injection nozzle; and moving the valve stem between an open position retracted from the injection orifice permitting flow of resin to the mold cavity, a closed position blocking the injection orifice and preventing flow of resin to the mold cavity, and an intermediate position between the open and closed positions to reduce heat transfer along the valve stem.

BRIEF DESCRIPTION OF DRAWINGS

Exemplary embodiments of the present invention will now be described with reference to the accompanying drawings, in which.

DETAILED DESCRIPTION

Figure 1:
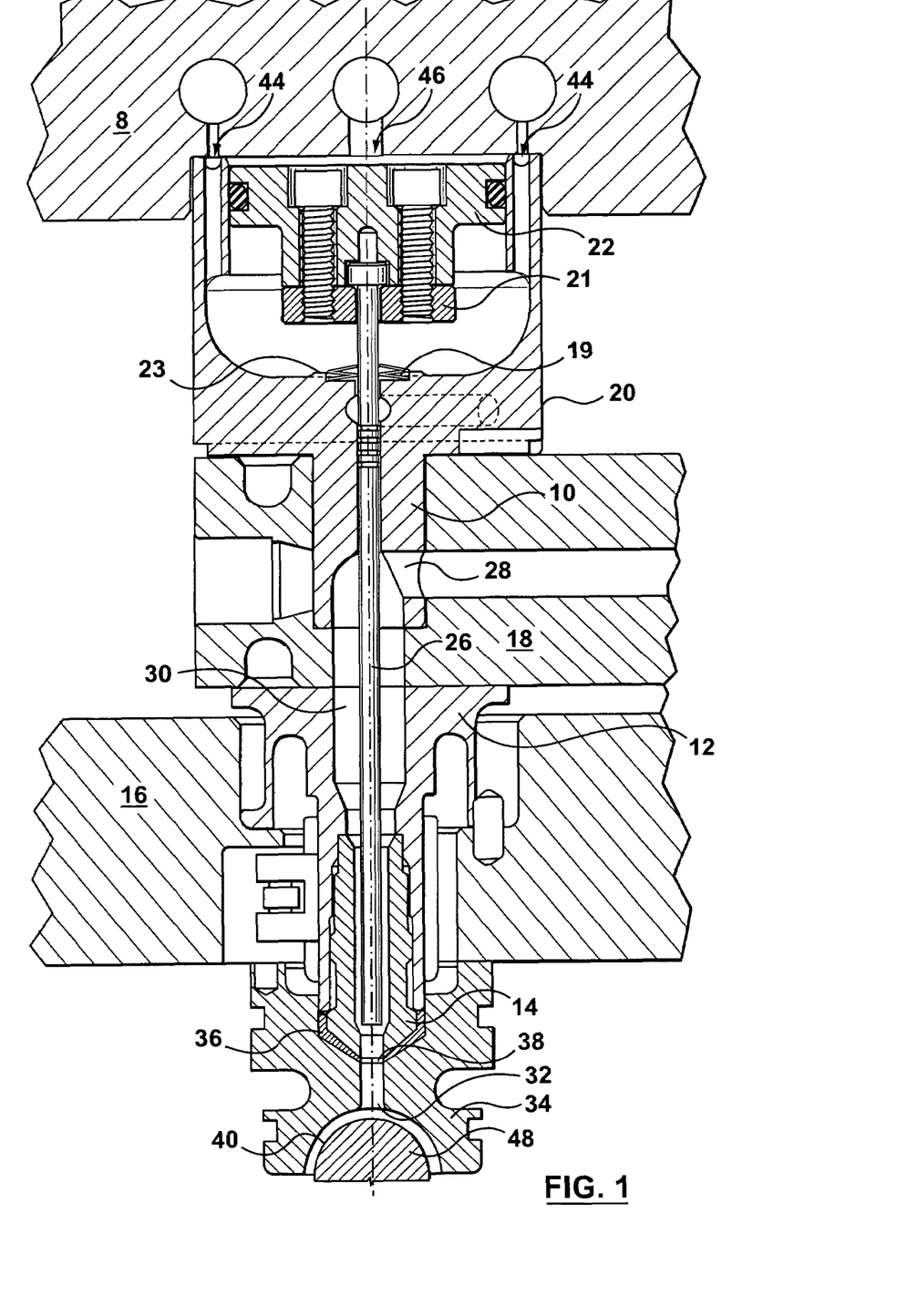
FIG. 1 is a sectional view through a nozzle assembly of a first embodiment of the present invention with the valve gate open and the valve stem retracted.
Figure 2:
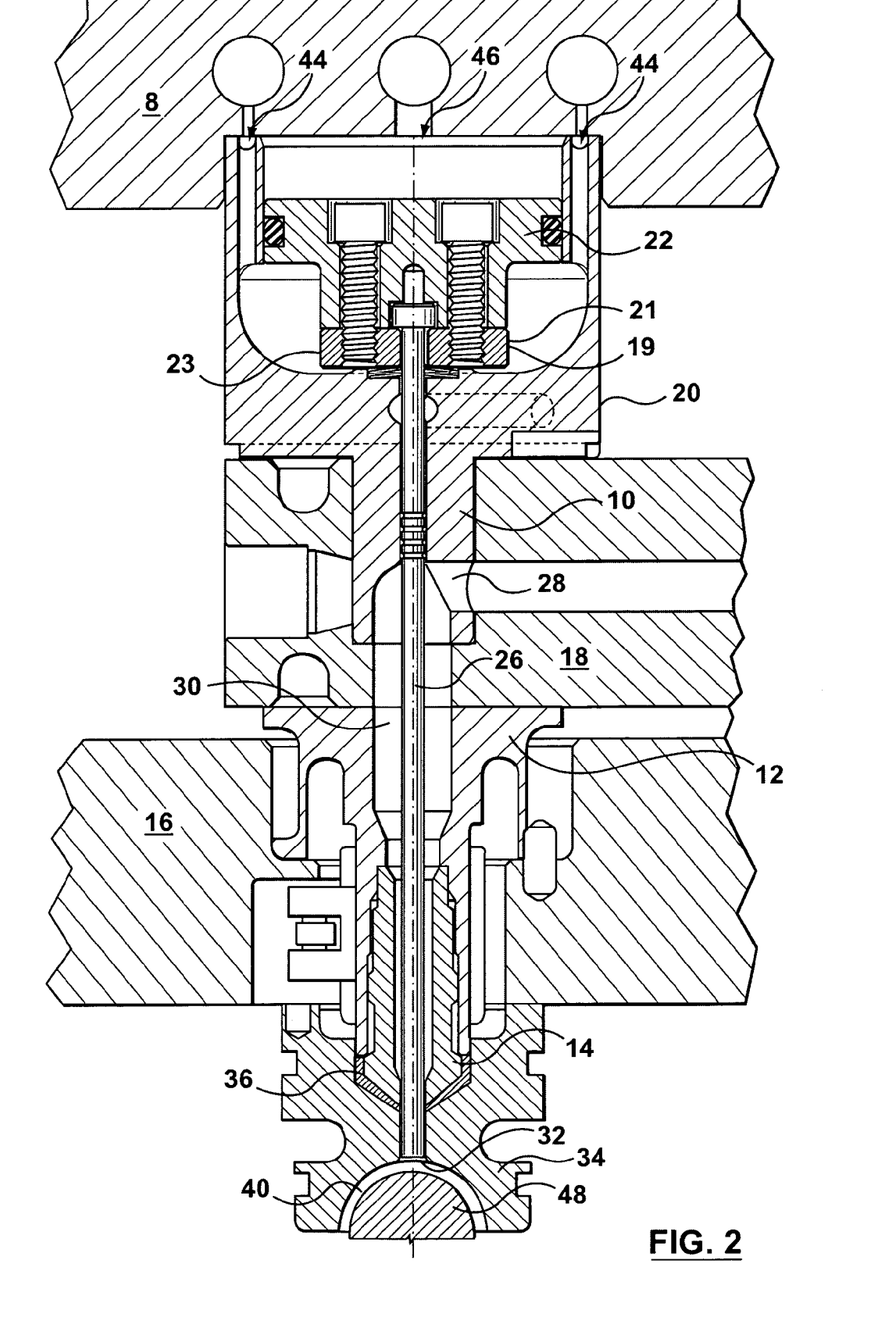
FIG. 2 is a sectional view similar to FIG. 1 with the valve gate closed and the valve stem in the closed position.
Figure 3:
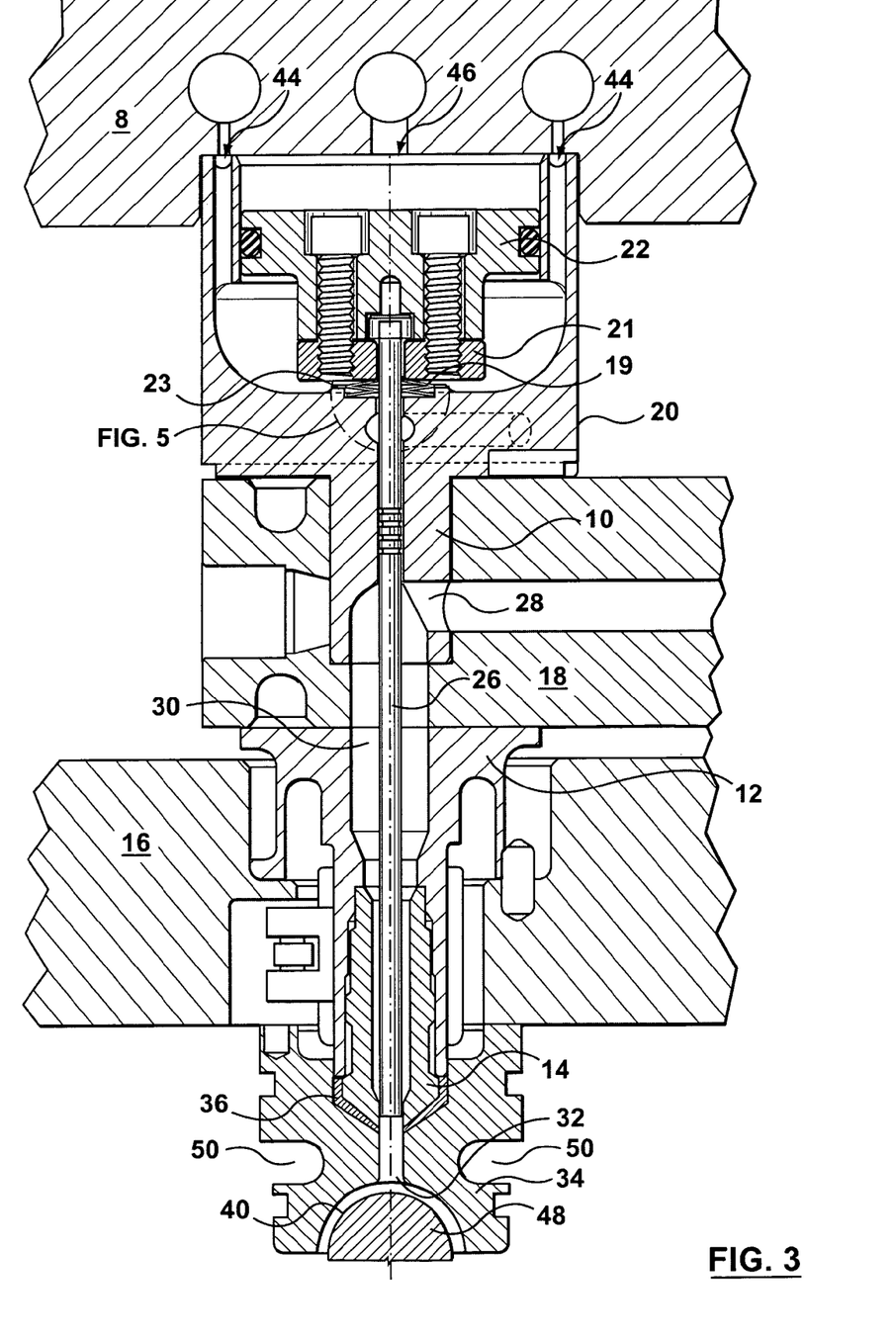
FIG. 3 is a sectional view similar to FIG. 1 with the valve stem in the intermediate position.
Figure 4:
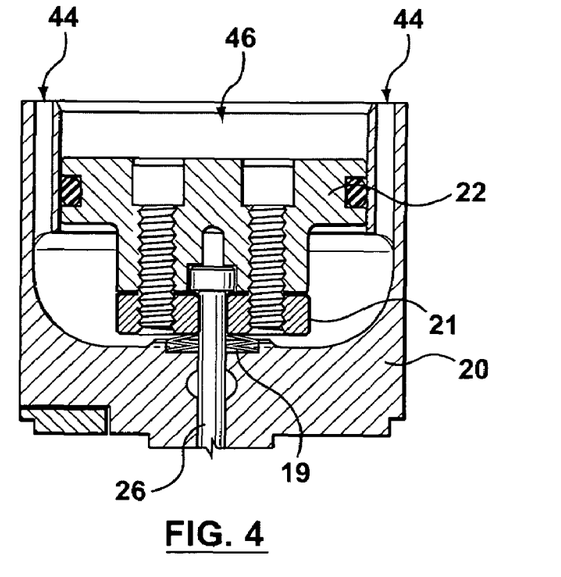
FIG. 4 is a sectional view of the cylinder and valve pin assembly of the embodiment shown in FIGS. 1, 2 and 3.

Referring to the drawings that show a first preferred embodiment of the nozzle assembly of the present invention. FIGS. 1-3 show the nozzle assembly in each of three valve stem positions. FIG. 1 shows an injection nozzle including nozzle housing 12 and nozzle tip 14 secured thereto. The injection nozzle is located in mold manifold plate 16 and supporting manifold 18. Mounted in manifold 18 is valve bushing 20 that contains pneumatic piston 22 that is attached to valve stem 26.

Melt channel 28 in manifold 18 is connected through extension 10 of valve bushing 20 to central melt channel 30 in nozzle housing 12 which in turn leads to injection orifice or gate orifice 32 in gate insert 34. Insulator 36 occupies the space between nozzle tip 14 and gate insert 34 and also contains a melt channel opening 38 therein. When the valve stem 26 is in the fully retracted position as shown in FIG. 1, resin can be injected through the melt channels to fill mold cavity 40 in a known fashion. In this embodiment the mold cavity has a gate nub in the gate orifice 32 so that when the mold cavity 40 and orifice 32 are filled with resin a molded part is formed having a nub.

Pneumatic piston 22 is operated by air pressure through air lines 44 and 46 from a source of compressed air (not shown) such that, by directing compressed air appropriately, valve stem 26 can be moved to one of two positions. In FIG. 1, piston 22 is fully retracted by compressed air flowing through line 44 causing the piston to move upward thereby fully retracting valve stem 26 within nozzle housing 12 and permitting resin to flow into the gate nub and mold cavity.

FIG. 2 shows valve stem 26 in the closed position protruding into the gate nub area. The valve stem 26 is moved to the closed position shown in FIG. 2 by exhausting air from line 44 to permit piston 22 to move forward and introducing compressed air into line 46 to move piston 22 forward.

FIG. 3 shows valve stem 26 in the intermediate position shutting off resin flow to the filled mold cavity 40 and to the filled gate nub but out of contact with the cooled gate insert 34. The valve stem 26 is moved to the intermediate position shown in FIG. 3 by spring 19 that operates to retract piston 22 a limited amount when the pressure on either side of piston 22 is equalized. Spring 19 is compressed when piston 22 moves forward to close the valve opening as shown in FIG. 1. In this slightly retracted intermediate position cooling channels 50 in gate insert 34 cause resin in the mold cavity 40 and gate nub to solidify prior to opening the mold but do not cool the end of valve stem 26 because it has been retracted into the warm and heated nozzle tip 14. For ease of illustration, the retraction into the intermediate position is exaggerated. In operation, the retraction to the intermediate position would be a few millimeters.

In operation, spring 19 is compressed when air pressure is applied to piston 22 to move valve stem 26 into the nozzle closed position. The spacer 21 contacts the upper surface 23 of the valve bushing 20 in the lower pneumatic chamber. The spacer 21 compresses the spring 19 and controls the extent of the compression of spring 19. After the end of cool time, the pressure on both sides of the piston 22 is equalized by opening both lines 44 and 46 to atmospheric pressure. Equalization of the pressure enables the spring 19 to decompress and thereby retract the pin 26 a distance corresponding to the decompressed state of spring 19. In a preferred embodiment, the spring 19 retracts the pin 26 about 2-3 mm. The pin 26 is kept in this retracted position out of contact with the cooled mold until the molded parts are ejected from the mold. After the mold has been opened, the parts ejected and the mold reclosed, the pin 26 is retracted by the application of pneumatic pressure through lines 44 to the underside of the piston 22 to open the nozzle and permit injection of the melt. When injection is complete and after hold, the piston 22 is activated to force pin 26 into the nozzle closed position and the cool and ejection cycle is repeated.

Figure 5:
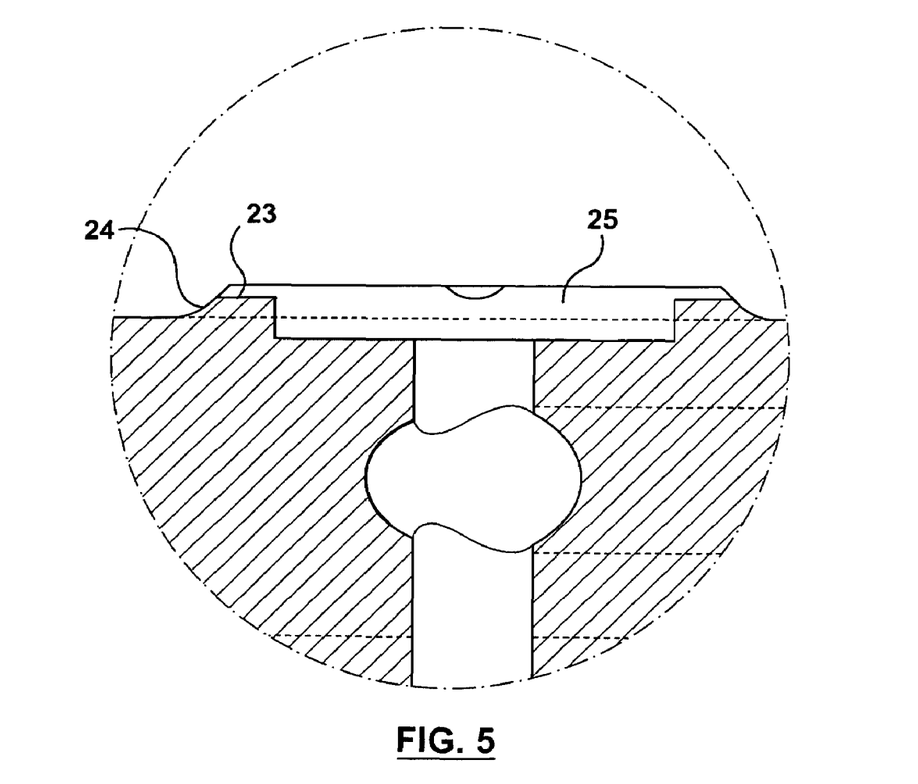
FIG. 5 is a detailed sectional view of a portion of the valve bushing in the embodiment shown in FIGS. 1, 2 and 3.

As shown in FIG. 5, the valve bushing 20 includes a boss 24 formed on its upper surface 23. The spacer 21 on piston 22 is driven into contact with the boss 24 by the application of pressure through line 46. When piston 22 is in this position, valve stem 26 closes the valve as shown in FIG. 2. A cutout portion 25 is formed within boss 24 to receive the spring 19. The cutout portion 25 is dimensioned so that the spring 19 can be fully compressed within the cutout portion 25 and does not prevent the piston 22 from moving into full engagement with the boss 24. Additionally, the spring 19 should only require minimal additional energy to be fully compressed by the piston 22 but sufficiently strong in compression that the spring 19 is capable of overcoming the frictional force created by the seals and sliding surfaces of the piston 22 and the valve stem 26 to move the valve stem 26 into the intermediate position shown in FIG. 3. In practice, we have found that Belleville washers work very well.

Obviously, other spring means could be used to move the valve stem. For example, a spiral spring could be placed between the outer cylindrical portion of the piston 22 and the base of the well of the valve bushing 20 as long as the spring did not interfere with the normal opening and closing of the valve gate. Also, compression of the spring by the air pressure would have to be avoided since such compression of the spring might lead to excess retraction of the valve stem so that the valve is open. Consequently, the preferred position of the spring is in a cutout portion 25 at the base of the well of the valve bushing 20 as shown in FIGS. 1 to 3. Of course, the cutout portion need not be on the base of the cylinder, it could be located within the base of piston 22 or spacer 21 and spring 19 compressed into such a cutout portion.

Figure 6:
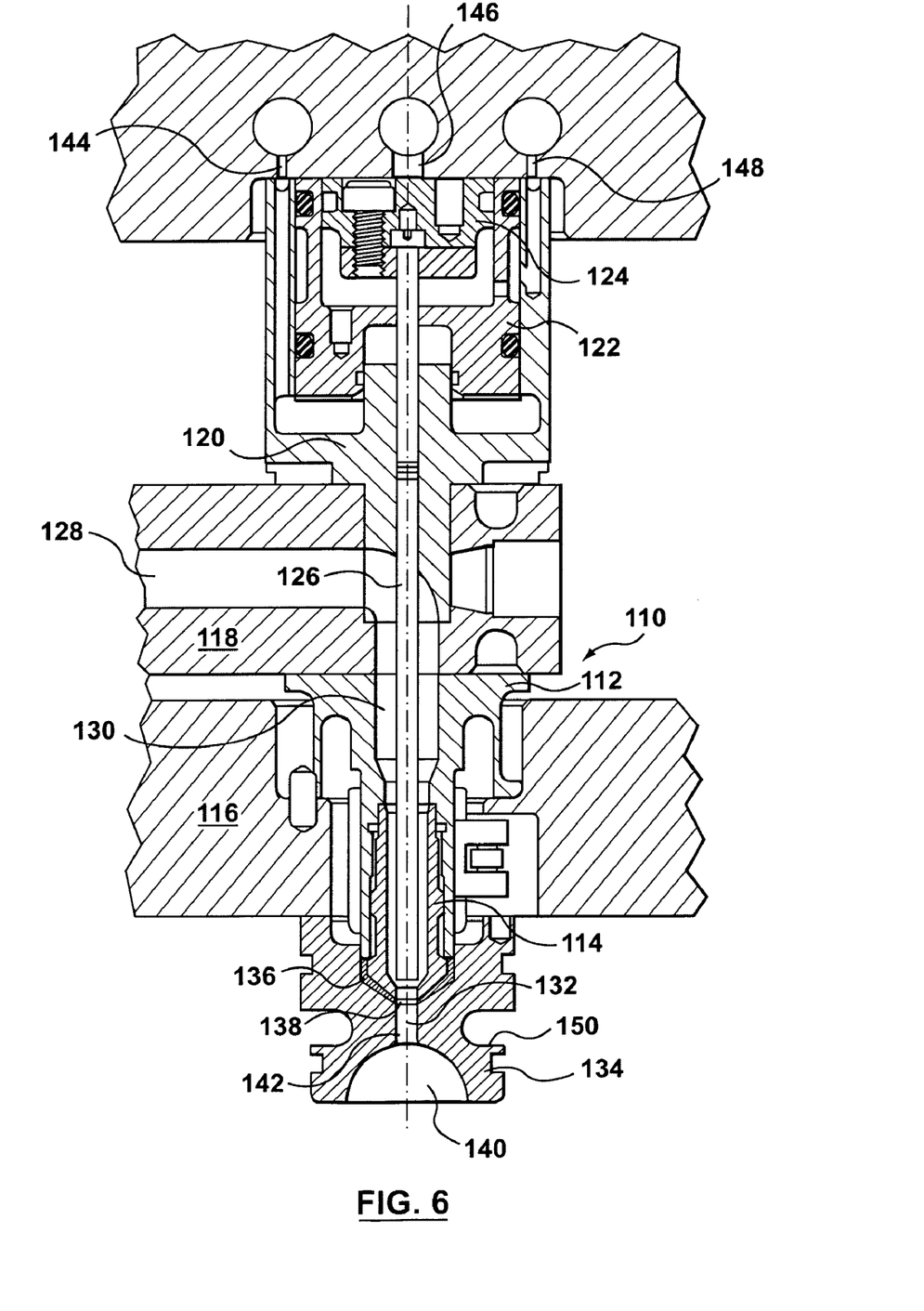
FIG. 6 is a sectional view through a nozzle assembly of a second embodiment of the present invention with the valve gate open and the valve stem retracted.
Figure 7:
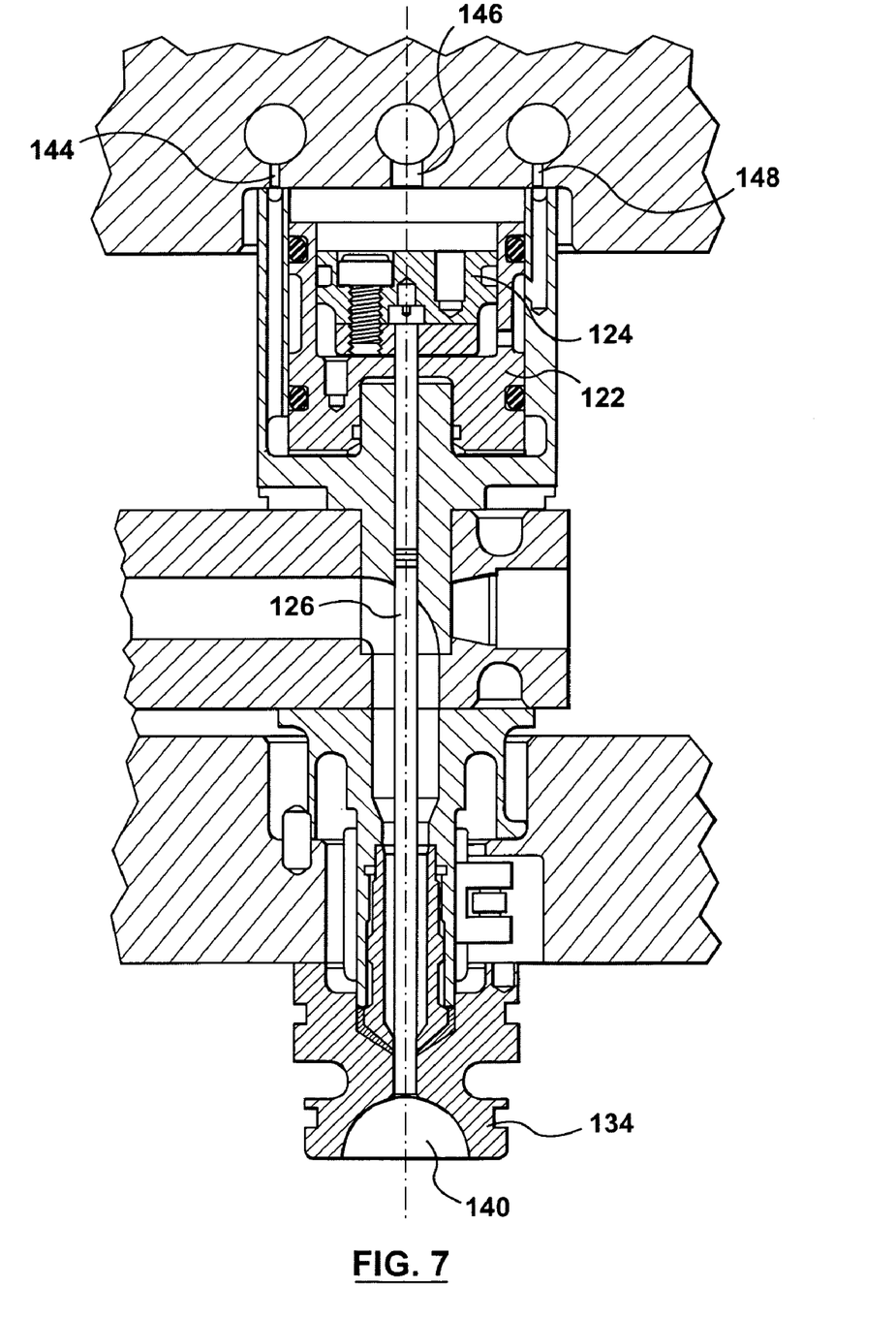
FIG. 7 is a sectional view similar to FIG. 6 with the valve gate closed and the valve stem in the closed position.
Figure 8:
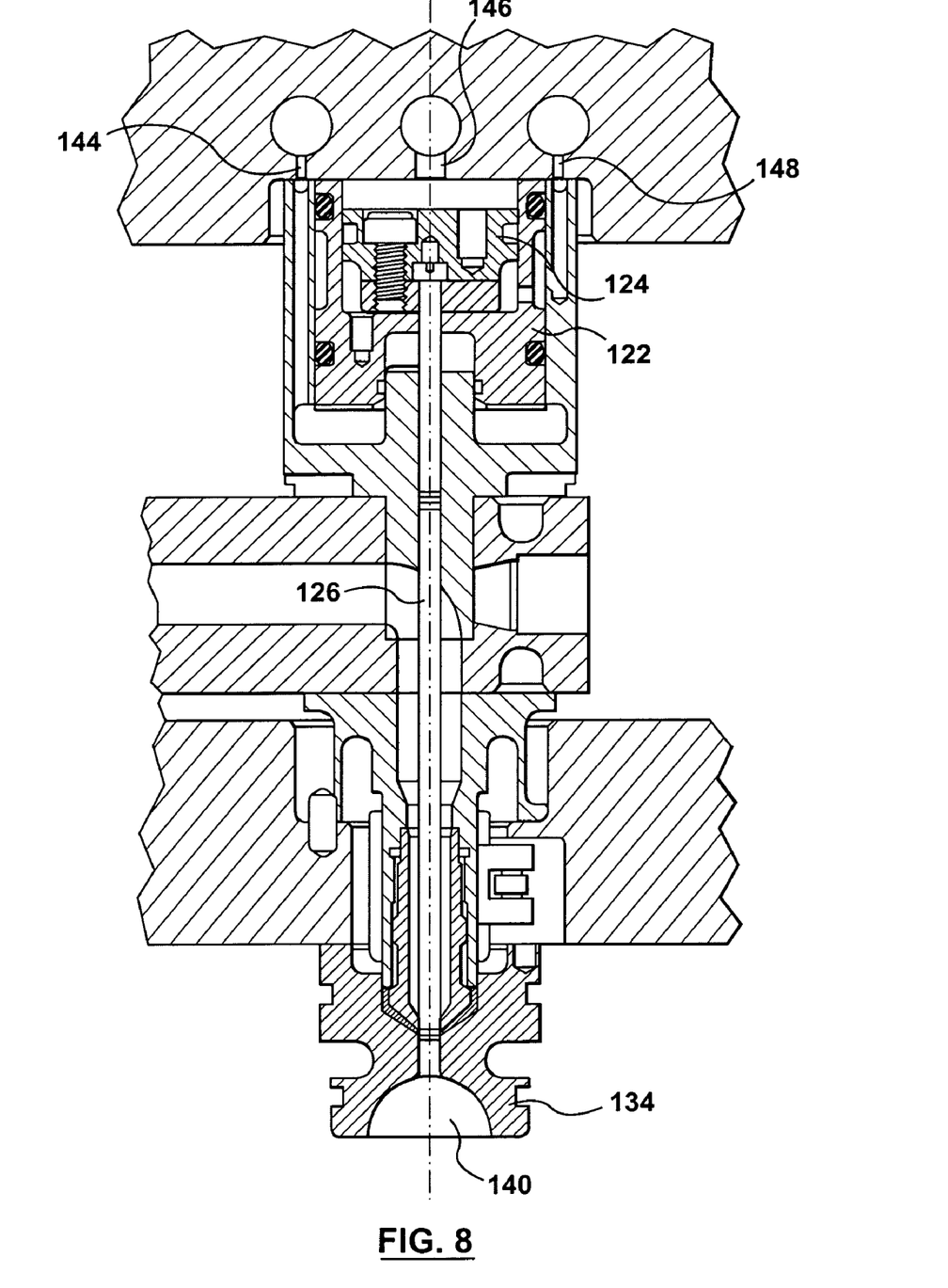
FIG. 8 is a sectional view similar to FIG. 6 with the valve stem in the intermediate position.

Referring to the drawings that show a second preferred embodiment of the nozzle assembly of the present invention, FIGS. 6-8 show the nozzle assembly in each of three valve stem positions. FIG. 6 shows injection nozzle 110 including nozzle housing 112 and nozzle tip 114 secured thereto. The injection nozzle 110 is located in mold manifold plate 116 and supporting manifold 118. Mounted in manifold 118 is valve bushing 120 that contains two pneumatic pistons 122, 124 to which is attached valve stem 126.

Melt channel 128 in manifold 118 is connected to central melt channel 130 in nozzle housing 112 which in turn leads to injection orifice or gate orifice 132 in gate insert 134. Insulator 136 occupies the space between nozzle tip 114 and gate insert 134 and also contains a melt channel opening 138 therein. When the valve stem 126 is in the fully retracted position as shown in FIG. 6 resin can be injected through the melt channels to fill mold cavity 140 in a known fashion. This mold cavity has a gate nub in the gate orifice 132 so that when the mold cavity 140 and gate orifice 132 are filled with resin a molded part is formed having a nub.

Pneumatic pistons 122, 124 are operated by air pressure through lines 144, 146 and 148 from a source of compressed air (not shown) such that by directing compressed air appropriately valve stem 126 can be moved to one of three positions. In FIG. 6, both pistons 122 and 124 are fully retracted by compressed air causing both of the pistons to move upward thereby fully retracting valve stem 126 within nozzle housing 112 and permitting resin to flow into the gate nub and mold cavity. Thus, in FIG. 6, compressed air is introduced into line 148 causing piston 124 to retract and is also introduced into line 144 causing piston 122 to retract. This fully retracts valve stem 126.

FIG. 7 shows valve stem 126 in the closed position protruding into the gate nub area. The valve stem 126 is moved to the closed position shown in FIG. 7 by exhausting air from lines 144 and 148 to permit piston 122 to move forward and introducing compressed air into line 146 to move both pistons 122 and 124 forward.

FIG. 8 shows valve stem 126 in the intermediate position shutting off resin flow to the filled mold cavity 140 and to the filled gate nub. The valve stem 126 is moved to the intermediate position shown in FIG. 8 by introducing compressed air into line 144 to move piston 122 into its retracted position while also introducing air into line 146 to advance piston 124 slightly forward and thus move the end of valve stem 126 into orifice 132. Piston 124 will contact piston 122 and not push it downward provided the projected area of piston 124 is less than the projected area of the underside of piston 122 since both are exposed to same air pressure. Cooling channels 150 in gate insert 134 cause resin in the mold cavity 140 and gate nub to solidify prior to opening the mold but do not cool the end of valve stem 126 because it has been retracted into the warm orifice 132.

Thus, the present invention provides a simple and expeditious three position hot runner valve stem that can move the valve stem into an intermediate position between the gate and the mold cavity to reduce or prevent substantial cooling of the valve stem by the cooled mold cavity.

It will, of course, be understood that the above description has been given by way of example only and that modifications in detail may be made within the scope of the present invention.

What is claimed is:

1. An improved method for injection molding in a hot runner system including an injection nozzle having a nozzle body,- a nozzle tip, and a valve stem and having an internal flow channel communicating with an injection orifice in a gate insert or mold that, in turn, communicates with a mold cavity,- said valve stem being reciprocable within said orifice to open and block said flow channel, said method comprising:

retracting said valve stem from within said orifice and from blocking said flow channel to permit molten material to flow into said mold cavity to fill said cavity;

moving said valve stem into said orifice to block said flow channel and said orifice when said cavity has been filled; and withdrawing said valve stem from the orifice of the gate insert or mold while maintaining the blocking position in said flow channel while said molten material is cooling in said cavity.

2. An injection nozzle for injection molding molten material into a mold cavity, said nozzle comprising:

a mold cavity;

an injection nozzle having a nozzle body, a nozzle tip and an internal flow channel therein, said flow channel communicating with an injection orifice in a gate insert or mold, that, in turn, communicates with said mold cavity for transportation of molten material to said mold cavity;

a valve stem mounted in said flow channel in said nozzle;

means to move said valve stem between an open position retracted from said injection orifice permitting the flow of molten material into said mold cavity and a fully closed position blocking said injection orifice and said flow channel, and preventing flow of said molten material into said mold cavity; and retraction means operable to retract said valve stem into an intermediate position where said valve stem continues to block said flow channel precluding flow of said molten material but wherein said valve stem is moved out of the injection orifice of the gate insert or mold.

3. An injection nozzle as defined in claim 2 wherein said retraction means is compressible by said means to move said valve stem when moving said valve stem to said fully closed position and retracts to a decompressed position after said valve stem has reached said fully closed position to retract said valve stem from the injection orifice of the gate insert or mold.

4. An injection nozzle as defined in claim 2 wherein said retraction means is a disk spring.

5. An injection nozzle as defined in claim 2 wherein said retraction means is a pneumatically operated positioning device.

6. An injection nozzle as defined in claim 2 wherein said means to move said valve stem and said retraction means comprise a single pneumatically operated positioning device that can position said valve stem in each of said open, blocking and blocking but removed from the injection orifice of the gate insert or mold positions.

7. An injection nozzle as defined in claim 4 wherein said means to move said valve stem is a pneumatically driven piston and said disk spring is confined within a depression in a cylinder of said piston when compressed by said piston.

8. An injection nozzle as defined in claim 4 or claim 7 wherein said disk spring is a Belleville washer.

* * * * *